(12) United States Patent
Granstedt et al.

(10) Patent No.: US 8,407,791 B2
(45) Date of Patent: Mar. 26, 2013

(54) INTEGRATED CYBER NETWORK SECURITY SYSTEM AND METHOD

(75) Inventors: Edouard Granstedt, Great Falls, VA (US); Troy C. Nolan, Bristow, VA (US); John A. Serabian, Jr., McLean, VA (US); Brian D. Womack, Leesburg, VA (US); Joseph S. Klein, Reston, VA (US)

(73) Assignee: Qinetiq North America, Inc., McLean, VA (US)

( * ) Notice: Subject to any disclaimer, the term of this patent is extended or adjusted under 35 U.S.C. 154(b) by 314 days.

(21) Appl. No.: 12/813,961

(22) Filed: Jun. 11, 2010

(65) Prior Publication Data

US 2010/0319069 A1    Dec. 16, 2010

Related U.S. Application Data

(60) Provisional application No. 61/213,469, filed on Jun. 12, 2009.

(51) Int. Cl.
*G06F 11/00* (2006.01)
*G06F 15/173* (2006.01)
(52) U.S. Cl. .......................... 726/22; 709/224
(58) Field of Classification Search ............... 726/22; 709/224
See application file for complete search history.

(56) References Cited

U.S. PATENT DOCUMENTS

2006/0101516 A1* 5/2006 Sudaharan et al. ............. 726/23
2010/0036946 A1* 2/2010 von Arx ........................ 709/225

FOREIGN PATENT DOCUMENTS

WO    WO2009/009859 A1    1/2009

OTHER PUBLICATIONS

U.S. Appl. No. 12/907,721, filed Oct. 19, 2010 (31 pages).
International Search Report for PCT/US2010/038308 (4 pages), Sep. 24, 2010.

* cited by examiner

*Primary Examiner* — Kambiz Zand
*Assistant Examiner* — Aubrey Wyszynski
(74) *Attorney, Agent, or Firm* — Finnegan, Henderson, Farabow, Garrett & Dunner, L.L.P.

(57) ABSTRACT

A computer system for providing security in a computer network includes: a global sensor device configured to determine potential threats to the computer network; a global threat manager device configured to determine identification information associated with the potential threats; and a local security device configured to detect the existence of the potential threats based on the identification information and to take remedial action in response to the potential threats. The system also provides for responding to network attacks in a sufficiently granular method that is optimized according to the current state of the network by maintaining a virtual model of the network; detecting a network attack; generating a plurality of alternative candidate remedial responses to the network attack; and determining a potential network impact of each candidate remedial response using the virtual model of the network.

33 Claims, 11 Drawing Sheets

Priority Table

Force Condition α

| | |
|---|---|
| Accounting | 7.5 |
| Human Resources | 2.3 |
| Field Operations | 5.6 |
| In-Bound Communications | 6.1 |
| Out-Bound Communications | 3.4 |

Force Condition β

| | |
|---|---|
| Accounting | 5.3 |
| Human Resources | 1.2 |
| Field Operations | 7.4 |
| In-Bound Communications | 3.3 |
| Out-Bound Communications | 5.8 |

Force Condition γ

| | |
|---|---|
| Accounting | 3.6 |
| Human Resources | 0.5 |
| Field Operations | 9.8 |
| In-Bound Communications | 1.5 |
| Out-Bound Communications | 7.0 |

Fig. 10

INTEGRATED CYBER NETWORK SECURITY SYSTEM AND METHOD

PRIORITY

This application claims the benefit of U.S. Provisional Application No. 61/213,469, filed Jun. 12, 2009, which is incorporated by reference herein in its entirety for any purpose.

TECHNICAL FIELD

The present disclosure relates generally to methods and systems for predicting, detecting, and responding to network attacks.

BACKGROUND

As the cyber world continues to expand and become denser, as wireless communications, satellites, telecommunications, and network and Internet infrastructures are integrated, such an increase in breadth and depth also introduces new vulnerabilities by providing cyber hackers with opportunities to use ever more sophisticated means and methods. Such incessant cyber attacks not only erode business integrity and undermine personal well-being but also threaten to compromise national security. Despite the fact that new systems and technologies may be designed with security in mind, the hacker always has the advantage that he may choose the time, place, and method of his attack, thereby rendering security mechanisms that are put into place at one point in time potentially impotent to guard against future attacks that utilize data or resources not known or available at the time of construction.

Traditional security mechanisms to deal with attacks on and intrusions into private networks, such as firewalls, anti-virus programs, and proxy servers, all suffer from certain drawbacks that may render them ineffective at guarding against many modern forms of cyber attack. For example, traditional security mechanisms operate by analyzing and working within the confines of primarily local data and information. For example, proxy servers typically limit their purview to the data that is transmitted outside of the network and the data that is transmitted into the network. In either case, the proxy server is limited to analyzing only the data that passes through it in order to determine whether that data reflects malicious activity. However, it may not be apparent or even determinable solely by analyzing such data whether there is malicious activity involved, as data may be encrypted or obfuscated, and seemingly benign or friendly external destination servers may be merely operating under the control of known malicious servers that are not visible to the proxy server.

Traditional security mechanisms are also primarily reactive in nature, relying on information about malware programs or attacks that have previously surfaced, and thus previously caused damage, in order to identify those same malware programs or attacks in the future.

Moreover, traditional security mechanisms suffer from the additional drawback that they are largely aimed only at preventing network intrusions from occurring and are thus largely ineffective at taking targeted and granular remedial actions once intrusions do occur.

SUMMARY OF THE INVENTION

The present information processes and collects global information to provide real-time, locally relevant and actionable threat defense management and response options. This information is integrated with local sensing, allowing for the real-time correlation of vulnerabilities with the presence of malicious activity, whether latent or manifest. This approach expedites the action taken to not only minimize attacks, but also to minimize attack opportunities and attack impact. The receipt of this globally collected and processed information can also be used to take more granular and automated action in order to minimize operational impact.

This approach also provides a mechanism by which the system can be inoculated against the threat until the appliance or application patch is developed, the system can be reconfigured in anticipation of future attack vectors, or, where applicable, active defense measures can be deployed to remove the threat. The global sensors that collect the raw threat and vulnerability information are driven by this learning mechanism to provide efficient and timely harvesting.

BRIEF DESCRIPTION OF THE DRAWINGS

FIG. 10 is a diagram depicting a priority table for storing priority sets to be used in scoring potential responses to network attacks, consistent with certain disclosed embodiments.

DETAILED DESCRIPTION

Figure 1A:
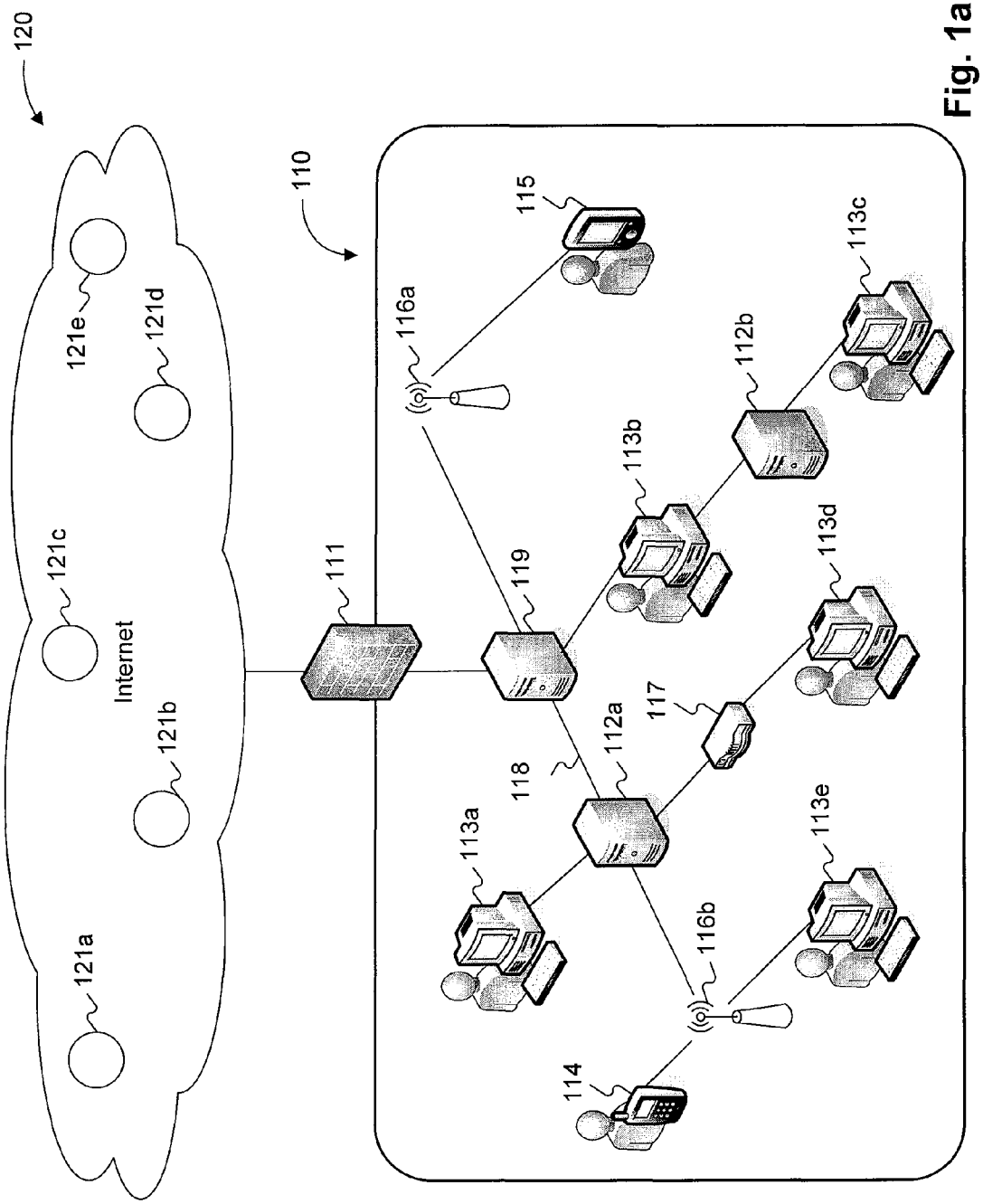
FIG. 1a is a diagram of an exemplary internal network interfacing with the Internet and utilizing global sensors, consistent with certain disclosed embodiments.

FIG. 1a is a diagram of an exemplary internal network interfacing with the Internet and utilizing global sensors, consistent with certain disclosed embodiments. As shown in FIG. 1a, network 110 may include one or more computers, e.g., user workstations 113a-113e; one or more internal servers, e.g., servers 112*a*-112*b*; one or more mobile devices, e.g., mobile phone 114 and/or personal digital assistant (PDA) 115. Each device in network 110 may be operatively connected with one or more other devices, such as by wired network cable, e.g., cat5 Ethernet cable 118; wireless transmission station, e.g., stations 116*a*-116*b*; network router, e.g., router 117, etc. It will be appreciated by those skilled in the art that many other types of electronic and analog devices may be included in network 110 or may be connected in different manners. It will also be appreciated by those skilled in the art that the devices resident in network 110 need not be physically collocated but may also be geographically spread across buildings, jurisdictional boundaries, and even foreign countries. Moreover, a given device may reside within multiple networks or may become part of a network only when certain programs or processes, such as a virtual private network, are operating.

Devices within network 110 may communicate with devices outside of the network, such as devices connected to the Internet 120, by, for example, directing communications to a proxy server 119, which first examines the nature of any data attempted to be transmitted out of network 110 to ensure that no private information is being transmitted out of the network or that no data is being transmitted to a location known to be suspect. If proxy server 119 is satisfied that there are no problems with the information being transmitted from a device within the network 110, proxy server 119 may forward the information itself to the device that was the intended recipient device (not shown) of the communication from the device in network 110. If any data is transmitted back from the recipient device, the proxy server may first inspect the data to ensure that there are no harmful programs or other data in the received communication, such as by comparing the received data with a series of known signature strings. If proxy server 119 is satisfied that the data received from the recipient device is safe, proxy server 119 may forward the received communication to the device within network 110 that was the intended recipient of the communication.

Network 110 may additionally include a firewall 111. Firewall 111 may examine communications to and from devices within network 110 to ensure that devices within network 110 are not communicating with known suspect locations or devices. Firewall 111 may additionally prevent devices within network 110 from communicating through ports known to be associated with harmful or malicious programs, and firewall 111 may block communications from external devices when those communications attempt to use suspect ports. Firewall 111 may additionally use a list of only those programs that are allowed to transmit and/or receive data outside of the network (i.e., a white list) or a list of programs that are specifically identified as prohibited from transmitting or receiving data outside of the network (i.e., a black list). It will be appreciated by those skilled in the art that firewall 111 may be implemented by hardware, software, or both. It will also be appreciated that each device within network 111 may alternatively or additionally have its own firewall.

As shown in FIG. 1*a*, the present invention comprises the strategic placement of global sensors, e.g., sensors 121*a*-121*e*, throughout the Internet for the purpose of detecting and collecting information related to potential threats to network 110. It will be appreciated by those skilled in the art that global sensors need not be truly "global" in the international sense, but may only be external to the network sought to be protected or able to send and receive communications to devices outside of the network. Global sensors 121*a*-121*e* may be personal computers, servers, routers, or other devices configured to communicate with devices outside of the network and/or inspect or monitor network traffic and transmit and receive data. Global sensors 121*a*-121*e* may also include or involve human operators who, for example, provide inputs to the global sensors or analyze semantic content not readily understandable by the global sensors.

Although not shown in FIG. 1*a*, the present invention contemplates that one or more devices within or associated with network 110 may communicate with one or more global sensors, e.g., to receive information from the global sensors about potential threats detected by the global sensors, such as viruses, malicious bots, or phishing attempts. The global sensors may maintain constant communication with devices associated with network 110 in order to deliver information in real time or in near real time as potential threats are detected.

Alternatively, since one or more global sensors may become infected or commandeered by malicious bots or viruses, it may be preferable to avoid direct connection between the sensors and any network 110 devices to prevent any such malicious program from spreading to the network 110 devices. Thus, the global sensors may instead communicate with network 110 by means of "push" and/or "pull" technologies whereby the global sensors, for example, rather than directly sending any data to network 110, instead post data to a server or other resource known to a network 110 device from which that network 110 device may download the data at arbitrary times, thus protecting network 110 devices from direct communication with a potentially infected global sensor. In addition, global sensors may first encrypt any data to be communicated to network 110 devices prior to transmitting that data either directly to any network 110 devices or indirectly by means of "push" or "pull" techniques.

Figure 1B:
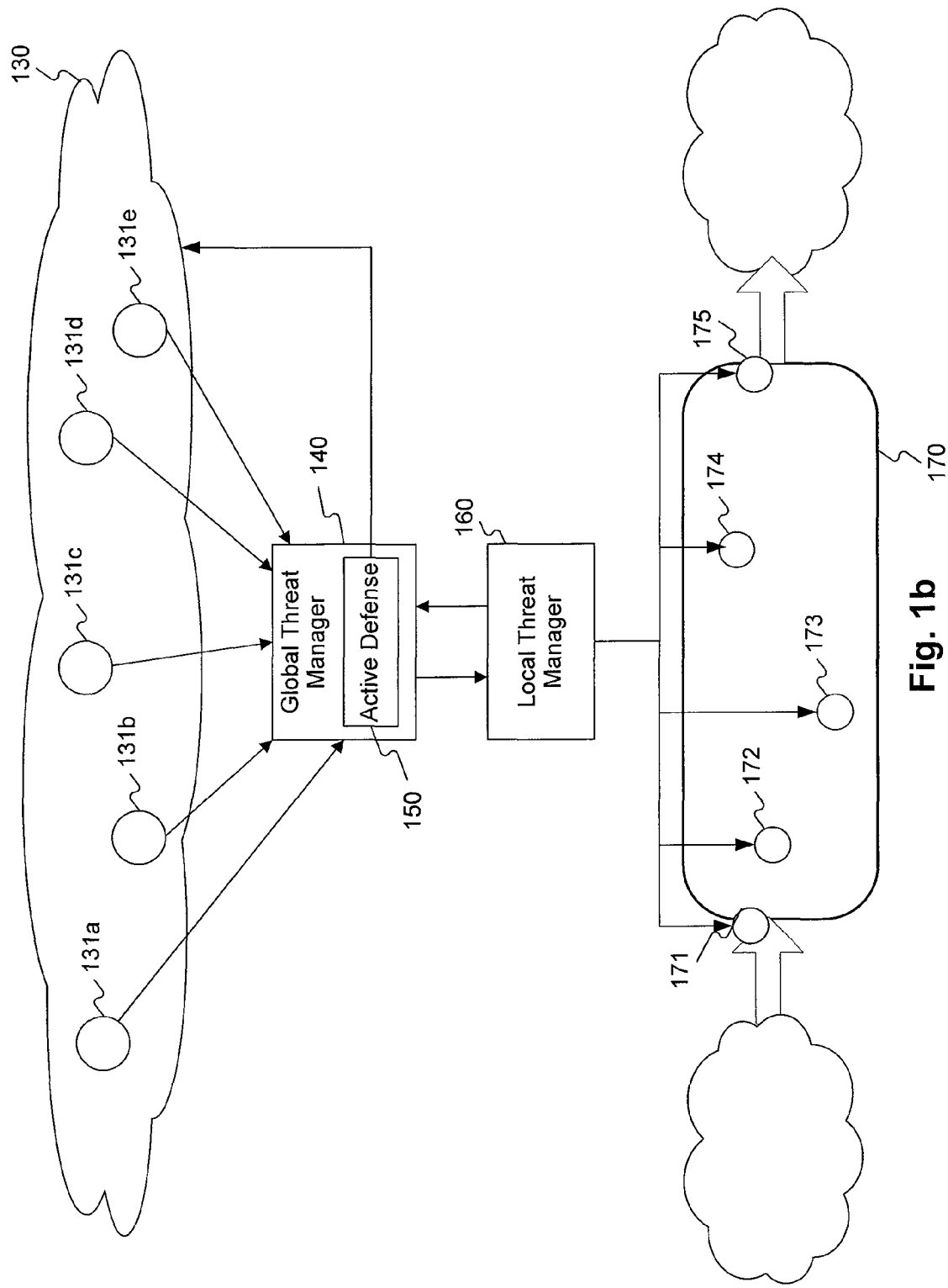
FIG. 1b is a diagram of an exemplary system for utilizing global sensors to provide tailored threat management information to an internal network, consistent with certain disclosed embodiments.

FIG. 1*b* is a diagram of an exemplary system for utilizing global sensors to provide tailored threat management information to an internal network, consistent with certain disclosed embodiments. FIG. 1*b* depicts a further exemplary embodiment in which information collected or analyzed by global sensors 131*a*-131*e* in a network 130, such as the Internet, is forwarded to a global threat manager 140, for example in real-time or near real-time. Global threat manager 140 performs further analysis of the data received from global sensors 131*a*-131*e*, for example in real-time or near real-time. For example, global threat manager 140 may further cull relevant information from non-relevant information or further winnow out false positives, may check the received information against data sources or repositories, such as subscribed security information feeds or host reputational databases, or may perform further data collection processes, either by itself or by sending further instructions to one or more global sensors, in response to the received information.

Global threat manager 140 may also categorize the information or otherwise order the information according to specific types of networks 170 or specific vulnerabilities within those networks. For example, network 170, which represents a network intended to make use of the information collected by global sensors 131*a*-131*e* and further analyzed by global threat manager 140, may be a small corporate intranet containing only a small number of user workstations running Microsoft Windows®-based operating systems and including a number of industry standard desktop publishing software applications. In that case, network 170's security concerns may be limited to Windows vulnerabilities, viruses, and email scams, and there may be no need for predictive information related to threats such as "denial of service" attacks or current vulnerabilities related to the Linux operating system. Accordingly, local threat manager 160 may provide information to global threat manager 140 regarding the characteristics of network 170 and the type of predictive security information needed. Using this information from local threat manager 160, global threat manager 140 may select only the information received from global sensors 131a-131e, or the information derived from further analysis of the information received from the global sensors, that is relevant to network 170 and may forward that relevant information in real-time or near real-time to local threat manager 160.

After receiving threat detection and prediction information from global sensor 140 that is appropriately tailored to the needs of network 170, local threat manager 160 then uses that information to provide local threat prediction, detection, and remedial operations in network 170. For example, local threat manager may employ a number of local sensors 171-175 throughout network 170 that actively monitor communications into the network (entry sensor 171), communications out of the network (leakage sensor 175), or communications or operations within the network (signature sensor 172, performance sensor 173, and behavior sensor 174) based on the information provided by local threat manager 160.

At the same time, additional networks 170 may contain local threat managers 160 that communicate with global threat manager 140 for the purpose receiving predictive security information related to the individual characteristics of each different network 170.

Global threat manager 140 may also include active defense functionality 150 for the purpose of not only collecting global threat information but also taking affirmative action related to global threats. For example, active defense functionality 150 may include functionality for attacking, disabling, or otherwise neutralizing a device in network 130. Global threat manager 140 may, for example, receive information from local threat manager 160 concerning a certain device or technique that is being used to attack or infiltrate network 170. Global threat manager 140 may then use that information to attempt to shut down resources currently being employed by the offending device, to disable the device, or to report information related to the device to appropriate authorities or parties.

Those skilled in the art will appreciate that the foregoing structure is exemplary only, and that many different variations may be used concerning the types and number of global sensors, global threat managers, and local threat managers (including local sensors). It will also be appreciated that the precise functions and responsibilities assigned to the different components of the system described above are exemplary only, and that various functions may be differently distributed or even duplicated among the various components of the system. Thus, for example, the global sensors may themselves take active defense measures or may categorize collected information into categories or priorities. Likewise, the global threat manager may perform some functions described above in connection with the local threat manager or vice-versa. Regardless of the specific allocation of functions among the different components of the system, the present invention contemplates that these functions may be performed in an automated and real-time or near real-time manner that provides local networks with highly current information concerning new attacks or threats. This approach eliminates the need to wait for third-party vendors to first analyze, often by human operators, threats that have already materialized or attacked existing networks and to develop patches to fix vulnerabilities related to such threats.

Figure 2:
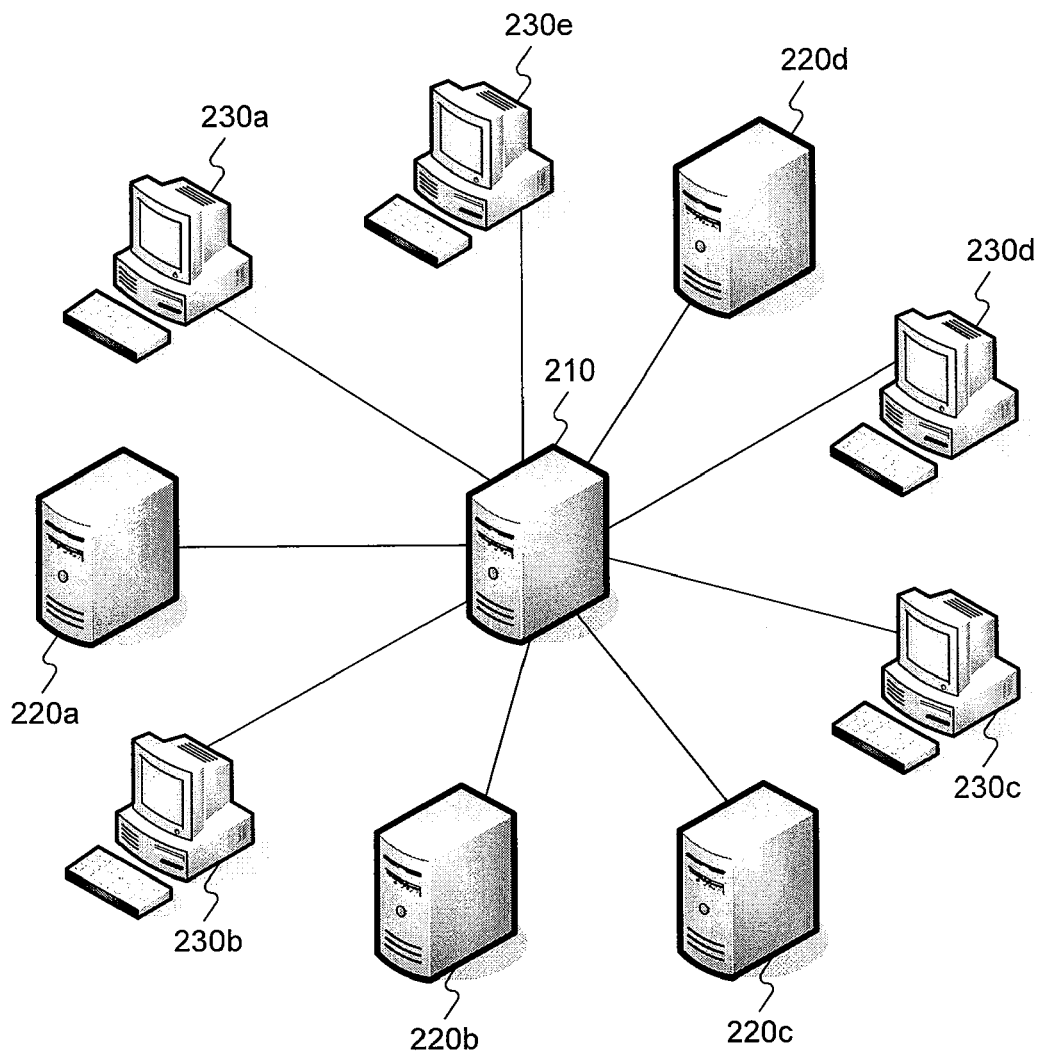
FIG. 2 is a diagram depicting the communications of an exemplary global sensor for determining potential threats to the computer network, consistent with certain disclosed embodiments.

FIG. 2 is a diagram depicting the communications of an exemplary global sensor. As shown in FIG. 2, global sensor 210 may communicate with a plurality of devices, such as servers 220a-220d or personal computers 230a-230e. Global sensor 210 may be connected to one or more devices by direct communication link, as depicted in FIG. 2, or merely by means of being connected generally to a network, such as the Internet, such that global sensor 210 is capable of communicating with one or more devices through the network.

Global sensor 210 may monitor Internet or other network activity by means of directly communicating with other devices on the Internet or by simply listening to communications between other devices when global sensor 210 is able to be privy to such communications, such as when global sensor 210 is on a carrier sense multiple access with collision detection (CSMA/CD) Ethernet channel and receives communications to and from all devices on the same channel irrespective of the intended recipients of such communications.

Global sensor 210 may monitor malicious Internet activity by actively searching for malicious activity by, for example, visiting websites or communicating with servers or domains associated with previously known attacks, viruses, or phishing attempts. Global sensor 210 may also visit websites or servers that, despite having no previously known associations with malicious activity, nonetheless fall within certain categories of content or behavior frequently associated with malicious activity, such as chat rooms, hacking, warez, spamming, illegal file-sharing, or adult websites. Global sensor 210 may download content from such websites to examine whether it contains any viruses or bots. Global sensor 210 may utilize geo-location techniques based on IP addresses to focus on websites and servers located in certain geographical locations known to have previous significant malicious activity. Global sensor 210 may also automatically subscribe to email list-serves hosted by various websites or may actively publish its email address throughout the Internet or at select strategic locations, such as chat rooms, in order to make its email address available for harvesting by spiders and other programs that crawl the net to collect email addresses. Global sensor 210 may also do the same with its IP address. Global sensor 210 may additionally or alternatively take passive measures to ensure that it leaves itself open for attack, such as leaving all or select ranges of ports open that might otherwise be blocked by firewalls and other software.

Global sensor 210 may additionally receive feeds containing information relating to any number of network security categories, including but not limited to threat signatures and/or behaviors, such as malware, phishing, and defensive response options; vulnerabilities; attack patterns; Internet architecture; cyber news; deployed local threat management (LTM) systems; human cyber subject matter expert (SME) analysis; hacker conferences, small group meetings, and publications; and physical network sensors on the Internet, extranet, and/or intranet.

Moreover, global sensors are not limited to the analysis of only raw data that is syntactically relevant to computers and other devices, but may also be programmed with various language and other content scanning and analysis software that enables the global sensors to analyze and report on semantic information, such as blog, email, chat room, or other human communications.

The foregoing methods of monitoring the Internet for malicious activity or potential threats are exemplary only, as those skilled in the art will appreciate many other ways of actively searching for potential threats or making a device open to attack.

The use of global sensors to proactively seek out potentially malicious programs and activities may be useful for overcoming a number of limitations common to traditional security mechanisms that rely on local information or are primarily reactive in nature. For example, malicious software robots or "bots" may enter into a network for the purpose of stealing information, controlling the network, or launching other attacks from the network to steal money. Such bots typically operate using a command and control protocol whereby they transmit any private information they obtain to a central server or other device, the "master," that may also provide additional instructions for how they are to operate.

Traditional security mechanisms suffer from the drawback that they must know in advance whether a particular external location is malicious in order to block any communications to that location. For example, a proxy server may not know that a request that is being made to a particular server is problematic because the domain associated with that server may have been registered only within the last week and there has not yet been any reported malicious activity associated with that domain.

Moreover, these traditional security mechanisms are ineffective at countering what are known as "polymorphic" bots. Polymorphic bots differ from normal bots in that, rather than being "hardwired" to communicate with their master and thus having their master's location (e.g., domain, IP address) encoded within their binary structure, instead they will have only an algorithm to execute at the appropriate time to ascertain the identity and location of their master. For example, the bot may know only that at a certain time and date that it is to execute a function that will take disparate pieces of information and combine them to reveal the name and location of its master. The bot master itself may not be accessible or even in existence until just prior to the time at which the bot is programmed to communicate with it. For example, the bot's internal algorithm, once executed, may yield the seemingly random string of characters "cn109cnz." However, just prior to the execution of that algorithm, the bot master may have registered the domain name "cn109cnz.net" as the location at which it may receive communications from the bot. The bot and bot master are therefore able to dynamically establish a completely new communications channel that, by virtue of having no prior history, will likely not be identifiable as malicious in nature.

By focusing only on local events and conditions, for example the digital structure of the polymorphic bot, which cannot reveal the location of the bot master until just prior to transmission, or the communications that pass through the proxy server or firewall, which may be encrypted and therefore not identifiable as containing private data, traditional security mechanisms may be ineffective at preventing polymorphic bot attacks. Likewise, polymorphic bots present a challenge to traditional security mechanisms, which are primarily reactive in nature, given that they rely on a bot's having been previously successful before they are able to recognize that bot's communications as suspect.

By contrast, the present invention is able to overcome these limitations by actively scanning the Internet for global information that can be used to predict, identify, and counter polymorphic bots. For example, and without limitation, global sensors may monitor new domain name registrations to determine potential locations for new bot masters to spring up and may block communications by any programs that attempt to transmit data to such locations.

Figure 3:
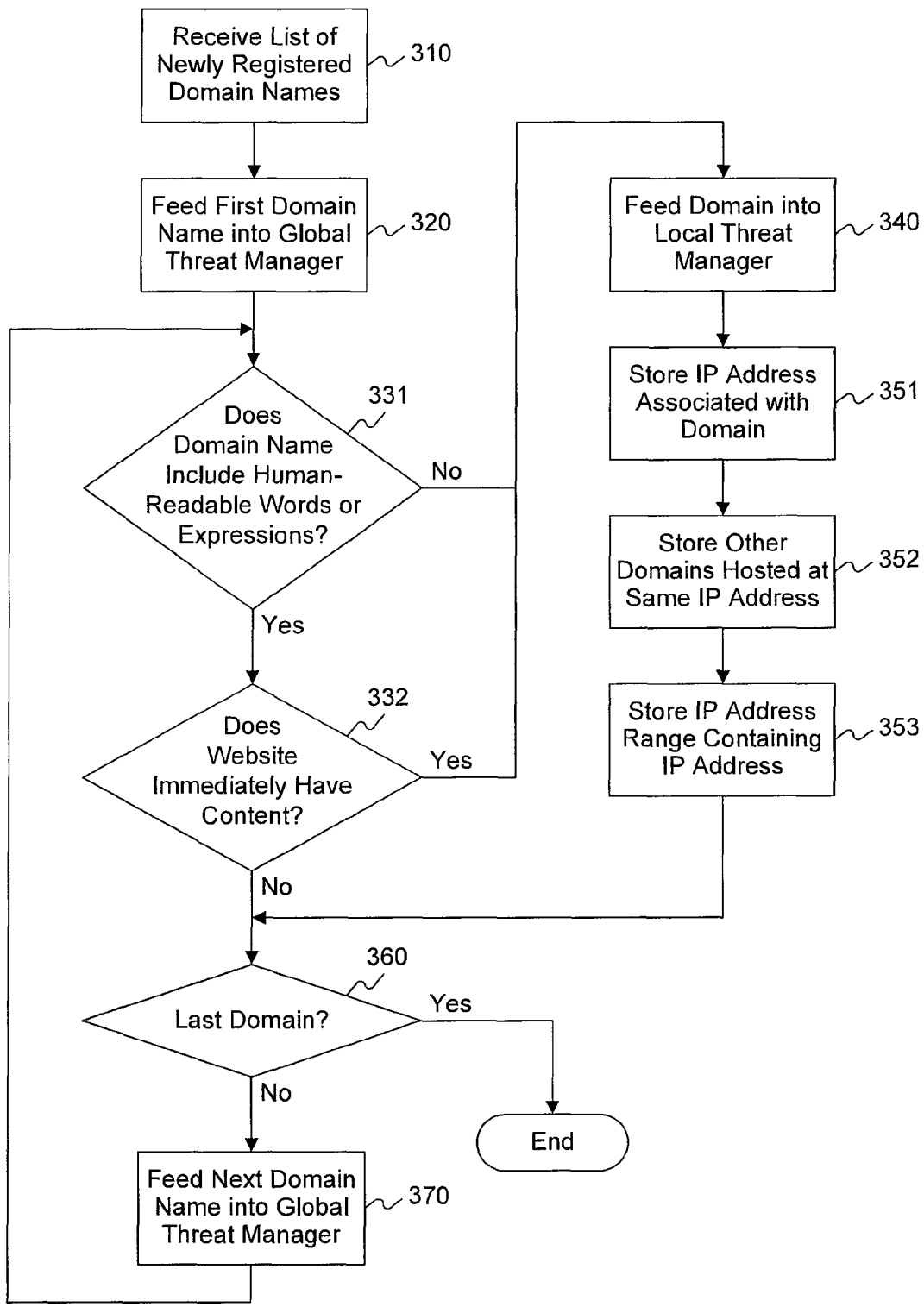
FIG. 3 is an exemplary flow diagram illustrating a method of monitoring new domain name registrations, consistent with certain disclosed embodiments.
Figure 4:
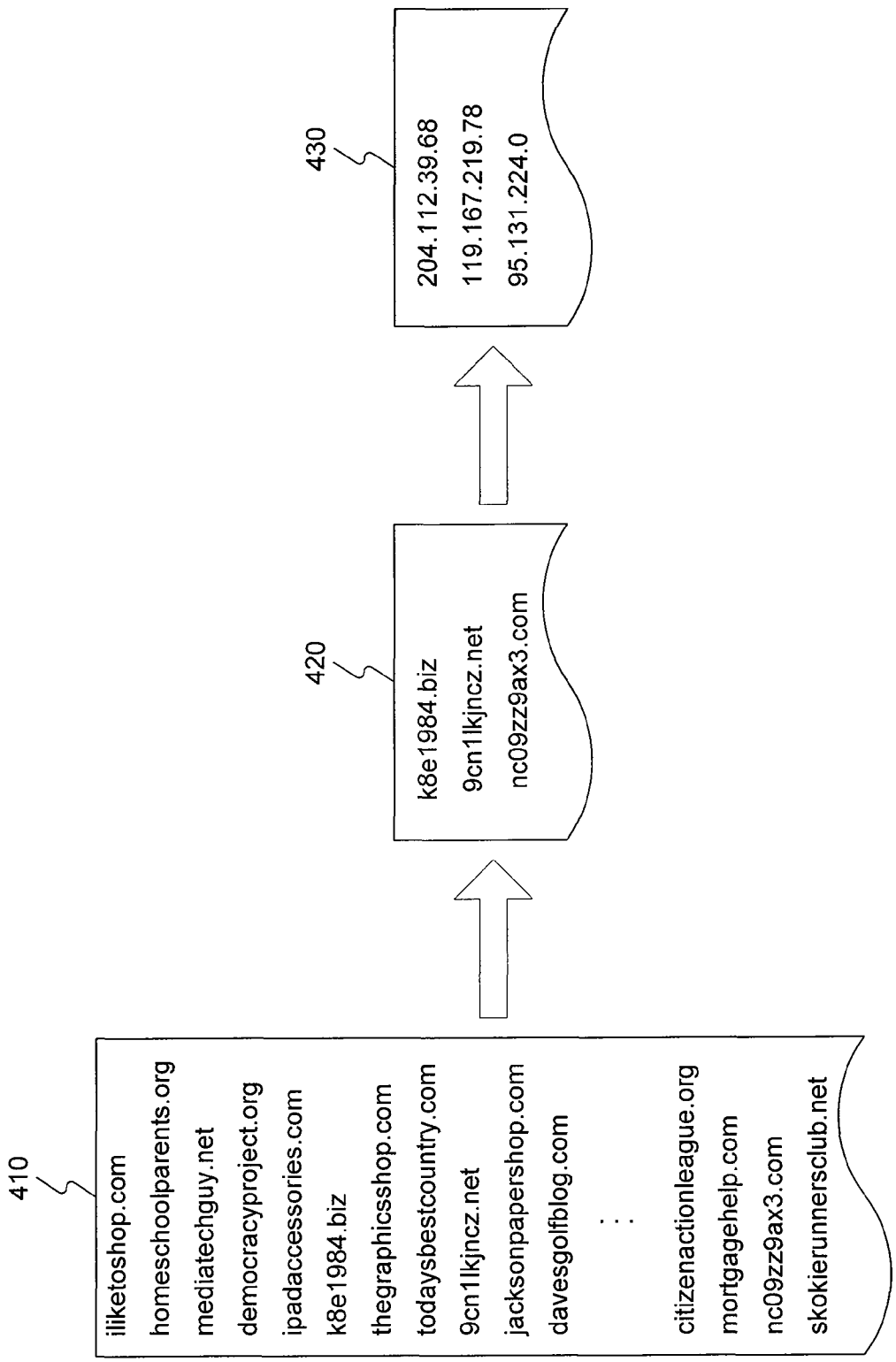
FIG. 4 is a diagram depicting the process of identifying suspect newly registered domain names and their associated information, consistent with certain disclosed embodiments.
Figure 5:
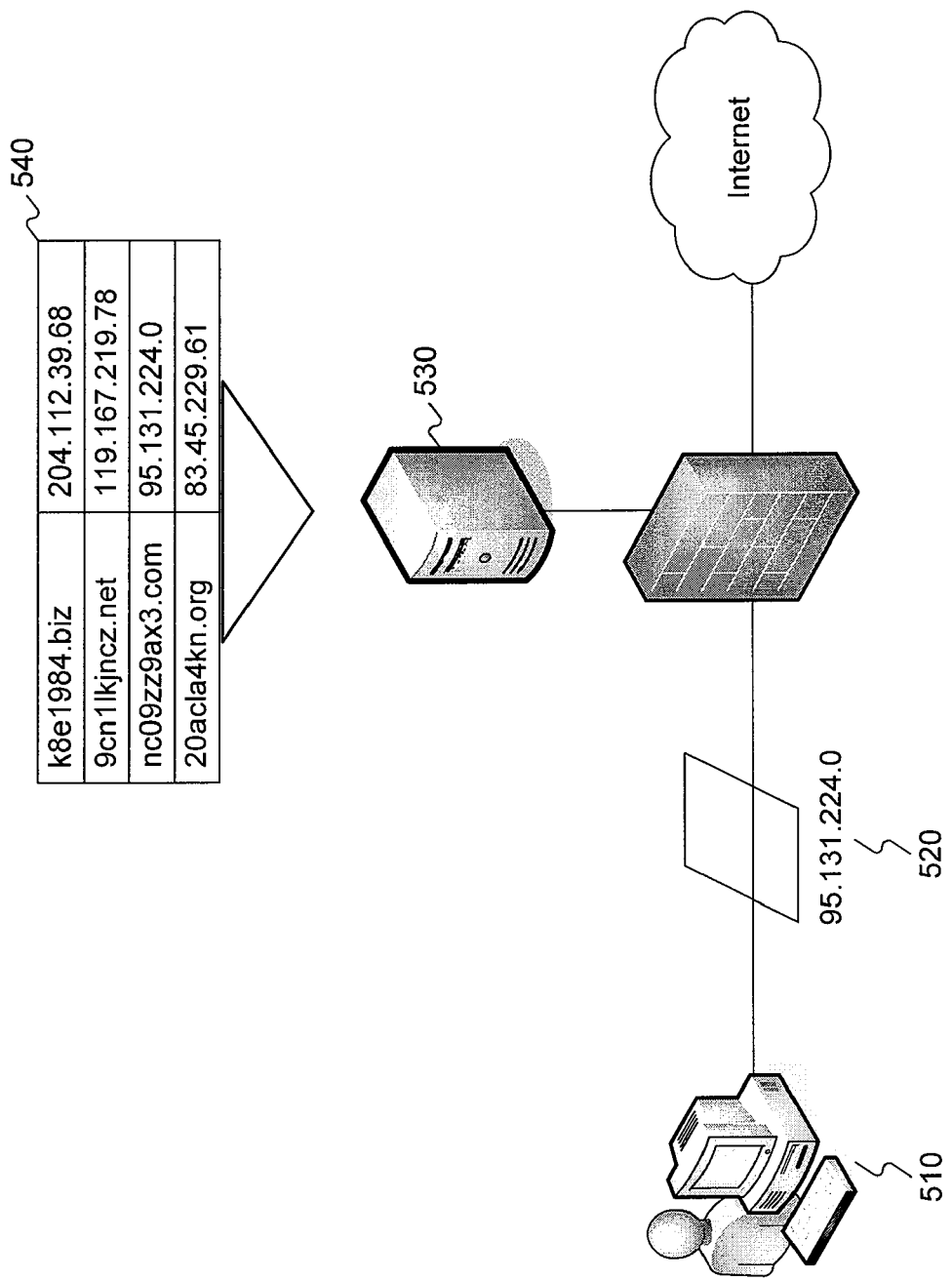
FIG. 5 is a diagram depicting a system for evaluating network communications in connection with information gained from the analysis of suspect newly registered domain names, consistent with certain disclosed embodiments.

FIG. 3 is an exemplary flow diagram illustrating a method of monitoring new domain name registrations, as depicted in FIG. 4, to locate and collect information associated with potential future attacks, as depicted in FIG. 5, consistent with methods and systems of the present invention. Global sensor 210 may receive or access a daily list 410 of new domain names that have been registered (step 310). For each domain name on daily list 410, a global threat manager segment of global sensor 210 may evaluate the domain name according to criteria designed to indicate the likelihood that the domain name may be associated with malicious activity (step 320).

For example, such predictive and non-predictive criteria may include a determination as to whether the domain name includes human-readable words or expressions, or is instead a string of seemingly random characters (step 331). Given that most persons and companies have an obvious incentive to make domain names memorable and intuitive in order to attract visitors, a newly registered domain name without any known human-readable words or expressions may indicate that the domain name is malicious, was registered by a program that creates seemingly random domain name strings according to internal algorithms for the purpose of registering large numbers of domain names, and that the domain name may be associated with malicious cyber activity.

List 420 in FIG. 4 depicts a set of domain names that have been culled from daily list 410 by the global threat manager because there are no human-readable words or expressions in the domain names. Those skilled in the art will appreciate that the set of suspect domain names 420 may be over-inclusive, as some domain names, e.g., "k8e1984.biz" may in fact represent mnemonics, i.e., "Katie, born in 1984," that are not recognized as having human associations and are therefore flagged as false positives in the set of suspect domain names 420.

As another example, the global threat manager may attempt to determine whether a website associated with the newly registered domain has content almost immediately after the domain name was registered (step 332). Given that it may be more typical for there to be a delay between the registration of a domain and the development of content associated with that domain for most legitimate personal and commercial websites, the creation of immediate content may additionally serve as an indication of potential malicious activity associated with the domain name. A domain name may additionally be flagged as suspect even if it contains human-readable expressions or otherwise satisfies other criteria that would suggest its presumed legitimacy if the domain nonetheless has associations with other known or suspected locations, registrants, or threats. For example, a human-readable domain name may have been registered by or to an entity associated with previous suspect domain names or malicious activity.

Additional mechanisms that may be used for the detection of suspect Internet hosts include examining communications by hosts to determine whether such communications adhere to various trust and operational models associated with communication protocols or otherwise exhibit typical behaviors, as violation of standard protocol or behavioral models may be a key predictor of malfeasance. The examination of Internet hosts and networks may also be performed in the context of other attributes that wrap the logical details in a social structure. Such other attributes may include WHOIS information, Autonomous System (AS) ownership information, phishing sources, IP block-list information, and compromised host information. Those skilled in the art will appreciate that there can be many additional criteria that may be used to determine and predict whether a newly registered domain name may be suspect in nature.

In the event that the global threat manager detects a suspect domain name, that domain name may then be fed into a local threat manager (step 340). The local threat manager may then execute a number of functions to ascertain additional information associated with the domain name, such as the IP address associated with the domain name (step 351), other domains hosted at the same IP address (352), as specified by the Domain Name System (DNS), or even a range of IP addresses that contains the IP address (353), which may reflect a geographical location from which cyber attacks may potentially be concentrated.

List 430 in FIG. 4 depicts a set of IP addresses associated with the set of suspect domain names 420, consistent with the foregoing techniques. Those skilled in the art will appreciate that many additional pieces of information, such as, without limitation, the names or addresses of entities to whom such domains are registered or the Media Access Control (MAC) addresses of various devices hosting the domain (if ascertainable), could also be included in list 430 and therefore specified as further criteria.

Finally, steps 360 and 370 reflect the iterative nature of the above-described process, as each domain name included in daily list 410 may be subject to one or more of the operations depicted in FIG. 3.

As the global sensor collects this information and either compiles it itself or forwards it to another device to perform compilation and analysis, a database or other collection of information, such as the one depicted in FIG. 5, is populated and may be continually updated with identification information used to detect potential threats. Those threats may include malicious programs, email, or other communications that attempt to enter network 110, or may already reside within network 110 but have yet to be detected, for example, due to inactivity within the network or failure to attempt to communicate with devices outside of the network.

For example, as depicted in FIG. 5, user workstation 510 may be infected with a bot or other malicious software program. Such a bot may have entered the network undetected due to an encoding that reflects a domain that has not yet been registered, or the bot may by polymorphic in nature and not contain any domain or IP address information within its binary structure until it computes such information dynamically at a designated point in time after having entered the network.

At a designated point in time, for example, after having collected sufficient private or sensitive information from workstation 510 or other devices in the network, the bot may attempt to transmit the data to its master using IP address 520. However, prior to any communications entering or leaving the network, server 530 may first inspect communications to determine whether they include any information contained within database 540. In this example, server 530 will recognize IP address 520 as having been entered into the database by virtue of its association with a recently registered suspect domain name, as depicted in FIG. 4. Server 530 may then prevent the communication from leaving the network and may further alert the proper personnel and/or automated security mechanisms about the device (i.e., workstation 510) associated with the suspect communication and the process identifier ("ID") of the process that initiated the communication, upon which appropriate investigative and potentially remedial action may be taken. Thus, the present invention provides a significant advantage over the prior art by utilizing global information to predict, detect, and neutralize malicious programs that were not or could not have been identified as malicious upon their original entry to the network.

As indicated by steps 352 and 353, the identification data stored within database 540 need not all be originally collected from global sensors, but may additionally come from further analysis of the data supplied by the global sensors. For example, database 540 may store additional domain names that are hosted by the same IP address as one or more domain names identified as suspect. Likewise, if one or more global sensors provide information concerning a number of suspect IP addresses that all fall within a certain range, server 530 or other devices tasked with analyzing the data in database 540 may additionally decide to flag as suspect any IP address within that range, even though various IP addresses within the range may not have been forwarded as suspect by any global sensors. Additionally, global sensors or other devices may monitor DNS registrations to keep track of new IP addresses that may be associated with suspect domains that are reassigned to different IP addresses and may store such additional IP addresses in database 540. DNS registration patterns may also be used to estimate the reputation of an IP address or domain name by tracking new registrations, rapidly changing registration data, and association with low reputation hosting providers.

Those skilled in the art will appreciate that the above-described method of collecting global information that may be used to identify potential threats is exemplary only and that there are many additional ways to monitor, collect, analyze, and/or compile such information. Those skilled in the art will also appreciate that server 530, or another device tasked with monitoring communication within or proceeding from the network, may choose to not require a perfect match between information contained within the attempted request out of the network and information within database 540, but may instead apply rules that calculate degrees of similarity, association, or probabilities of correspondence with one or more pieces of information within database 540.

Those skilled in the art will also appreciate that the present invention is not limited to communication from devices within the network to devices outside of the network, but may additionally be used to monitor communications from devices outside of the network to devices within the network or communications between devices within the network. In fact, the present invention may also be used to analyze any and all data in the network, even if that data is not part of a communication, attempted or otherwise. For example, under the present invention, otherwise static or non-ambulatory data, such as files or user workstation hard drives, may be monitored or scanned on a regular basis to detect whether any malicious programs or kinds of threats may reside therein, whether by virtue of recent arrival into the network or workstation or new information collected from global sensors that would allow threats previously assumed to be benign in nature to be recognized as suspect.

The present invention also contemplates that data retrieved from global sensors may be combined with data received from other sources, such as vendor-supplied lists of additional threats or patterns to monitor. Moreover, such vendor-supplied data may be forwarded to one or more global sensors in order to provide the global sensors with starting points or "leads" for looking for malicious activity. The global sensors may also receive periodic information or updates for the purpose of "tweaking" or optimizing the manner in which the global sensors search for or collect information based on further analysis of information previously forwarded by the global sensors, vendor-supplied information, or any other information that may be used to further configure, redirect, or optimize the performance of the global sensors.

The present invention also contemplates that global information (e.g., information outside of the network) may be captured, analyzed, and used to detect threats through means other than global sensors. For example, any attempted communications into the network or out of the network may be analyzed to see whether they are of a malicious nature or whether they are able to provide information about other potential threats. Moreover, the present invention contemplates that such analysis may be performed across the many layers of the networking stack and the current operating environment, with a view of the infrastructure vulnerabilities. This perspective provides more complete information on the threat environment that is directly applicable to user applications and behavior down through the protocols and behaviors of the underlying hosts and devices.

One example of such malicious communications is the technique of "phishing." Typically, in a phishing attempt, a hacker, through a server or other device, sends a user an email that purports to and appears to be from an institution with which the user may have an account, for example a bank. The phishing email typically informs the user that his or her account has been temporarily suspended, for example due to supposed unauthorized activity associated with the user's account, and invites the user to log into his or her account to reauthorize the account. The email typically provides a link that, when clicked, takes the user to a website that is designed to mimic the bank's user login screen but in fact is hosted by the hacker's server. If the user attempts to "log in" by supplying the counterfeit website with his or her username and password, the hacker is provided with the user's login credentials and is then able to log into the user's actual bank account in order to perform malicious activity such as identity theft or the transferring of funds to an account owned by the hacker.

Figure 6:
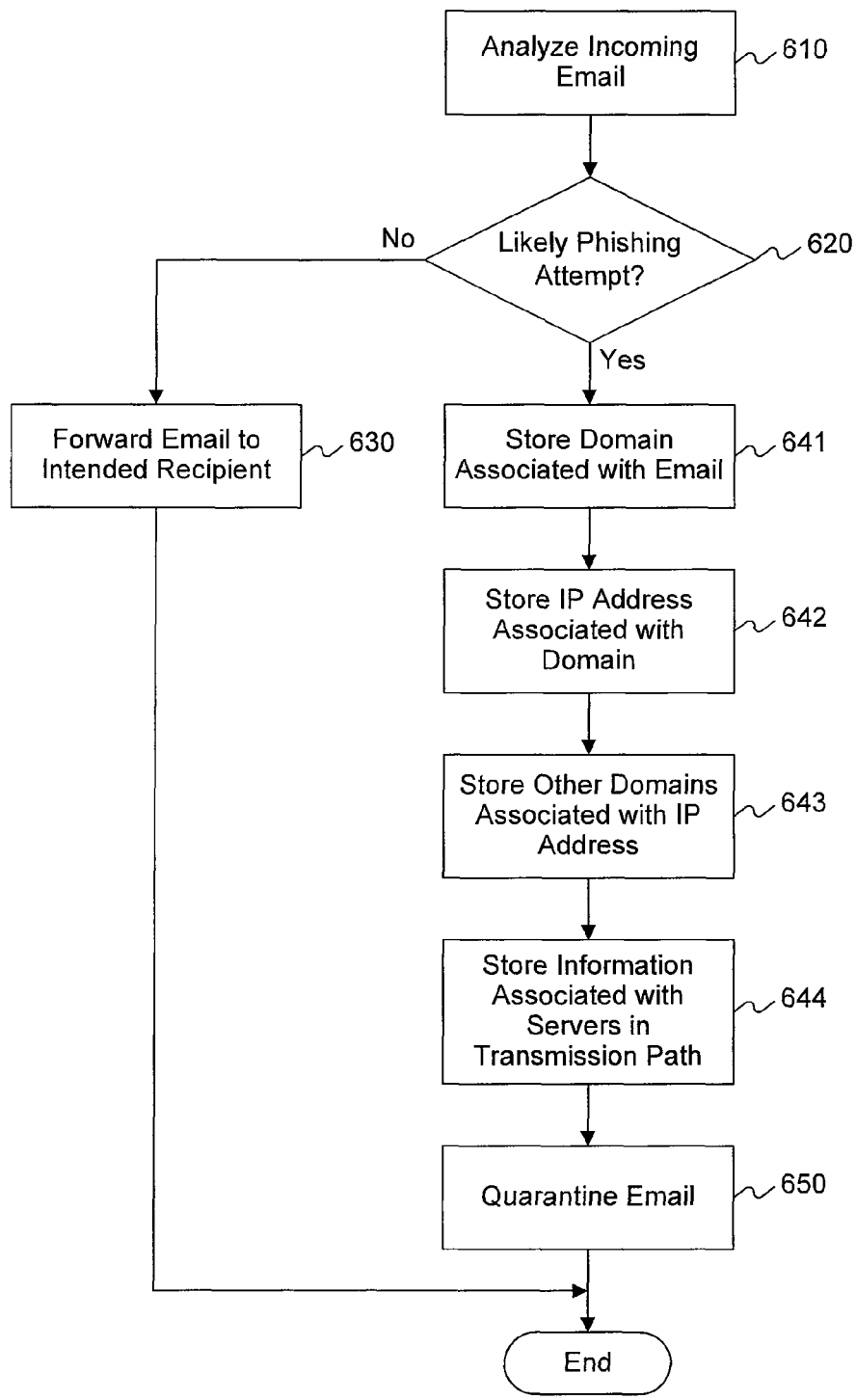
FIG. 6 is an exemplary flow diagram illustrating a method of utilizing information collected from phishing attempts to detect future malicious activity, consistent with certain disclosed embodiments.
Figure 7:
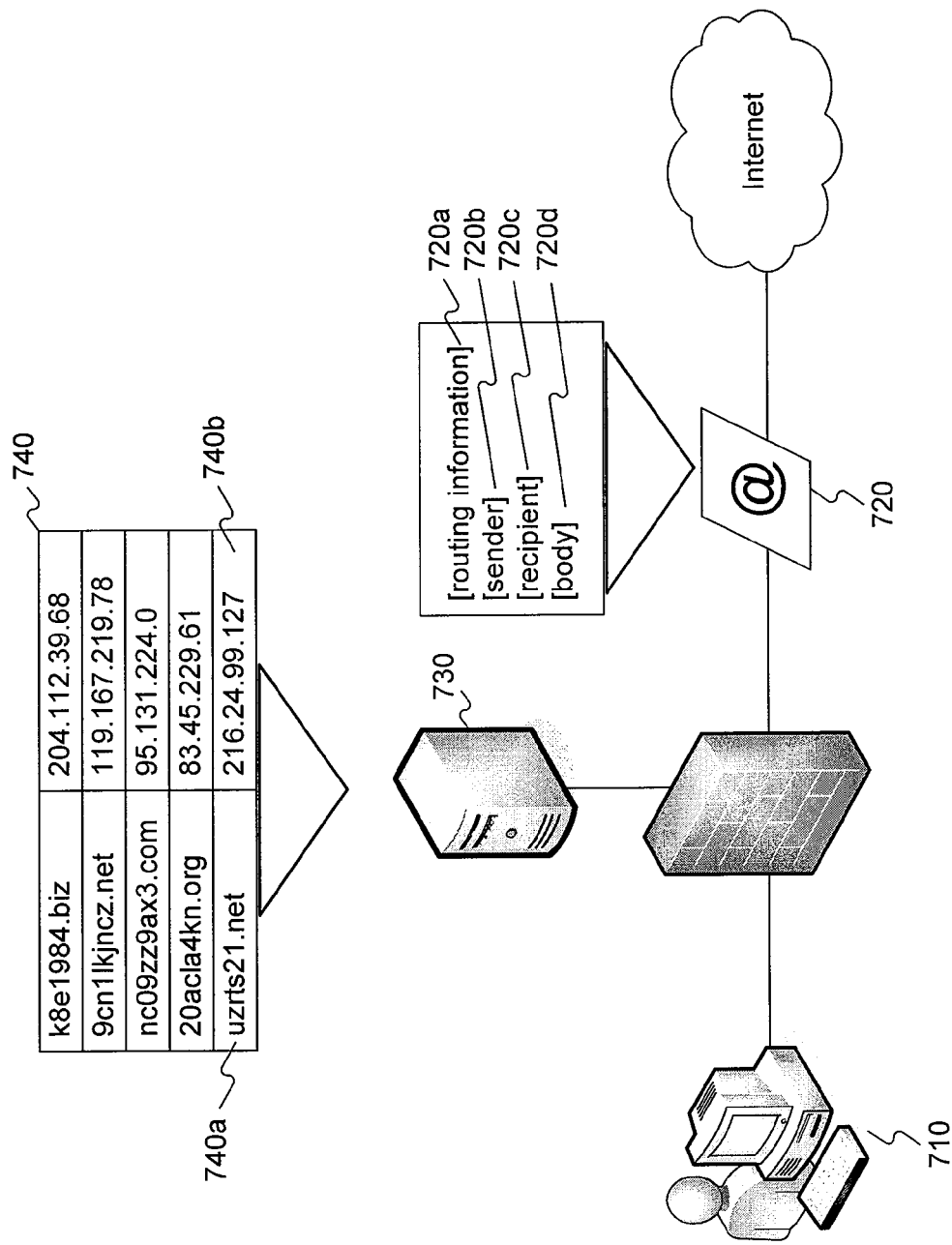
FIG. 7 is a diagram depicting a system for collecting threat information associated with a phishing attempt, consistent with certain disclosed embodiments.

FIG. 6 is an exemplary flow diagram illustrating an analysis of malicious emails, such as phishing attempts, to locate and collect information associated with potential future attacks, as depicted in FIG. 7, consistent with methods and systems of the present invention. In step 610, an email 720 sent from a device outside of the network (not depicted) to a user workstation 710 within the network is first intercepted and examined by a security device 730. In step 620, security device 730 analyzes the email to determine whether the email may be a phishing attempt. Such analysis may involve scanning for keywords included within the email body 720*d* that are common among phishing emails, such as "login," "unauthorized," or "bank." Security device 730 may also detect misspelled words or incorrect grammatical constructions, which are typical in phishing attacks. Security device may also evaluate whether a link in the email contains an anchor attribute that does not match the anchored text, for example a link that displays as "www.suntrust.com," yet points to http://login.suntrust.qucn10n.net/?cna=18u3. Those skilled in the art will appreciate that there may be a number of techniques for analyzing the content of the email to determine whether it may be malicious in nature. Security device 730 may alternatively or additionally identify phishing attempts based on other information associated with the email, including without limitation, the email's routing information 720*a*, sender information 720*b*, and/or recipient information 720*c*.

In the event that the email is not identified as a likely phishing attempt (step 620, No), security device 730 may forward the email to the intended recipient (step 630). In the event that the email is identified as a likely phishing attempt (step 620, Yes), security device 730, or another device, may analyze data associated with the email to identify other potential threats, current or future.

For example, sender information 720*b*, if accurate, may reveal a domain 740*a* and associated IP address 740*b* that may be added as identification information to database 740 (steps 641 and 642), which in some embodiments may be a further expansion of the information contained in database 540 in FIG. 5. Additionally, other domains, IP addresses, or other information contained in or related to email 720 or routing information 720*a* may also be placed into database 740 (steps 643 and 644). Finally, email 720 may be quarantined or placed in an appropriate location for either discarding, forwarding to authorities or other interested parties, or notifying the intended recipient to provide the recipient with an opportunity to ratify or modify the identification of the email as illegitimate (step 650).

As previously described in the embodiment of FIG. 5, the information contained in database 740 may be used to identify other potential threats. For example, an attempted communication from a device within the network to a device outside of the network may be identified as suspect if that communication is to IP address 740*b* or any other IP address associated with routing information 720*a*. Although the program initiating the attempted communication may not have been initially detected as malicious when it first entered the network, its attempt to communicate using information associated with a previously detected malicious activity—namely, phishing email 720—allows security mechanisms to now recognize it as potentially malicious and to take appropriate corrective action. The present invention therefore overcomes the limitations of the prior art by using global information to identify malicious activity that could not be detected using solely local information such as the structure of the malicious program itself.

Once again, it will be appreciated by those skilled in the art that the present invention is not limited to collecting identification information from emails alone, but also contemplates collecting information from any and all communications to, from, or within the network. Moreover, the present invention also contemplates the harvesting of information from within the network, even if that information is not contained within communications, attempted or otherwise. For example, in the event that malicious programs or activities are detected within the network or located by global sensors outside of the network, security device 730 may analyze such programs or activities to compile information about them, such as, without limitation, structural signatures, behavioral or network signatures, and/or associated domain or IP address information. Security device 730 may use this information to identify future threats, including malicious programs or communications. Moreover, security device 730 may further use such information to re-scan past network traffic to assure that newly discovered threats are not and have not been in the network.

Those skilled in the art will also appreciate that the present invention is not limited to the collection of data directly harvested from malicious programs or suspect communications, but may also be derived from analyzing such original data to collect and amass further data that is either related to the original data or may be inferred from it. The present invention also contemplates that security devices may also attempt to visit or otherwise communicate with any servers associated with suspect domains or IP addresses to attempt to gain additional information from such servers, such as detecting any malware or viruses resident on those servers. Further information associated with those malwares or viruses may additionally be analyzed and entered into database 740 to identify potential future threats.

This technique of proactively searching for such malware or viruses that may have not yet become widely disseminated among the Internet or detected by other security mechanisms thus allows the present invention to overcome the reactive and locally focused limitations of the prior art. Moreover, the present invention contemplates that such information associated with any malware or viruses found as a result of communicating with servers associated with phishing attempts or other malicious activity may itself lead to the discovery of additional domains, IP addresses, or servers that may be identified as malicious and from which identification information may be harvested. The identification of malicious activity within or outside of the network may thus lead to a non-terminal chain of analysis, investigation, and identification whereby new domains, IP addresses, servers or other data are continually identified and information associated therewith is continually catalogued into database 740.

As previously mentioned, the present invention also contemplates that information contained database 740 may contain false positives, as, for example, emails may be falsely identified as phishing attempts or servers or domains through which genuinely malicious emails or programs have passed may actually be benign in nature despite having been an unknowing conduit for malicious activity. Therefore, the present invention contemplates a nuanced approach to cataloguing identification information in database 740 and detecting potential threats based on that information. For example, the invention may utilize information either collected or purchased from vendors regarding reputations of, for example, servers, domains, IP addresses, or geographic locations and thereby grant emails associated with any of the foregoing certain presumptions of legitimacy or illegitimacy. Thus, for example, an email may be preliminarily flagged as potentially fraudulent or illegitimate in nature, such as a phishing attempt, by the system. However, the email may be associated with a server, domain, IP address, or geographic location that is granted a presumption of legitimacy by virtue of prior legitimate activity or a lack of history of malicious activity stemming from the geographic region. The email may, therefore, either not be marked as malicious or may be forwarded to a manual operator to make a determination as to whether the email is malicious rather than being automatically marked as such.

Once a threat to the network or other malicious activity within the network has been detected, the present invention contemplates a dynamic and operationally-aware approach to neutralizing the threat that involves evaluating a number of alternative remedial responses against a continually updated model of the network in order to evaluate the likely effect of each alternative response prior to taking any corrective action. In one exemplary embodiment, this evaluation occurs pursuant to an automated, near real-time, execution of the dynamic network model to score the alternatives against a set of parameters that permit preservation of the fundamental mission of the network infrastructure. Such an automated evaluation of the mission impact may enable a "man-in-the loop" selection based on the scores or an automated implementation of the selected response based on the current in-force policies.

Figure 8:
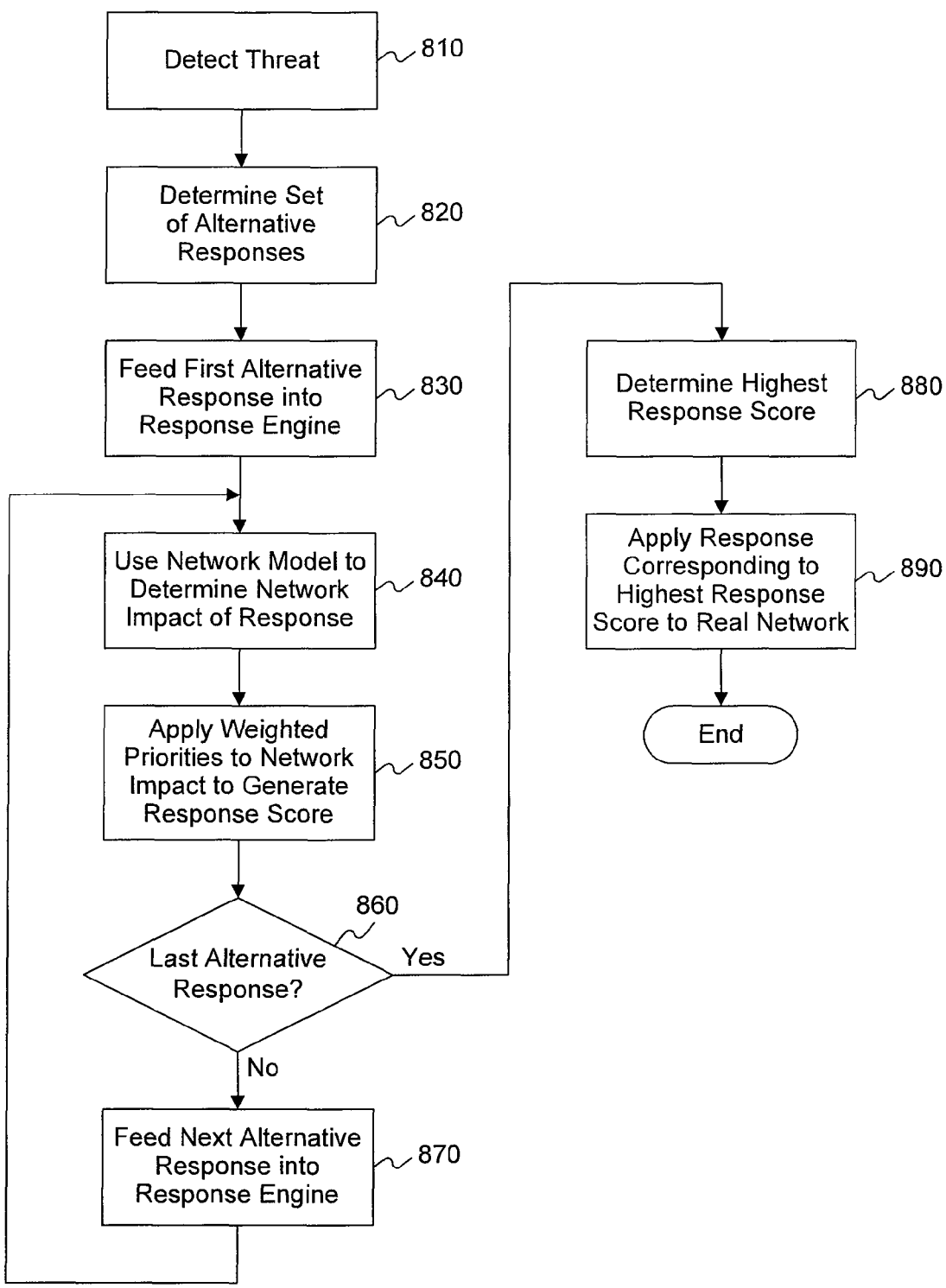
FIG. 8 is an exemplary flow diagram illustrating a method of evaluating potential responses to network attacks against a network model and according to weighted criteria, consistent with certain disclosed embodiments.
Figure 9:
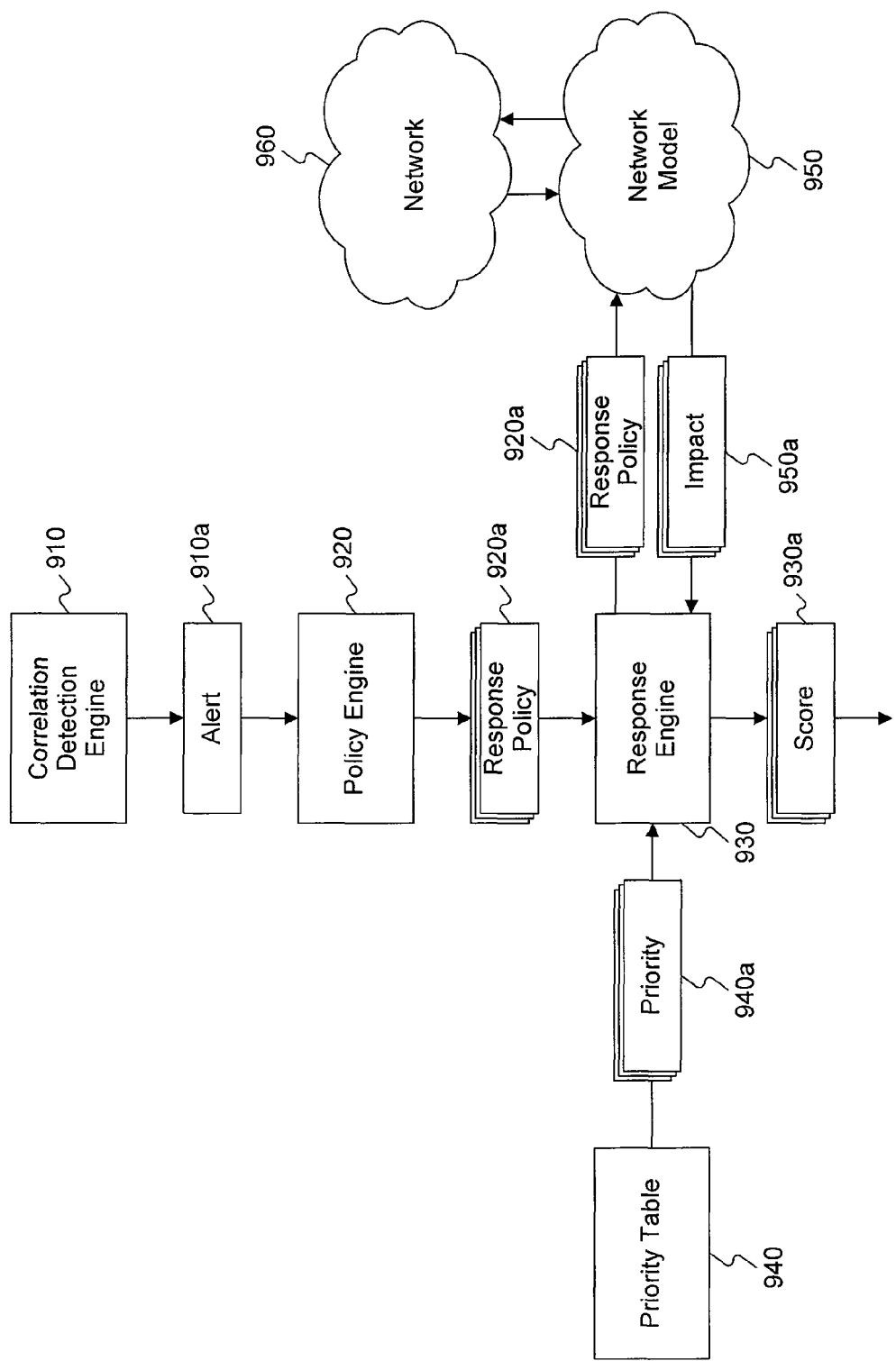
FIG. 9 is a diagram depicting a system for evaluating potential responses to network attacks against a network model and according to weighted criteria, consistent with certain disclosed embodiments.

FIG. 8 is an exemplary flow diagram illustrating a process of testing potential procedures for responding to network attacks against a network model according to weighted criteria. As depicted in FIG. 9, a network 960 is continually monitored to detect any structural or functional changes within the network. At the same time, a network model 950 may be maintained and in some cases continually updated to reflect the current state of the network 960. Network model 950 allows system administrators to know the state of network 960 at all times and also provides a tool for evaluating the impact of modifications to the network 960 by first testing those modifications against the network model 950.

A correlation detection engine 910 may continually monitor network 960 to detect threats or attacks that are directly applicable to vulnerabilities that are present on the network infrastructure. This correlation function is not limited to directly present vulnerabilities, but may also comprise aggregate effects that are on balance a threat to the network. Once correlation detection engine 910 detects a threat 910a to the network (step 810), for example a threat that matches a vulnerability that is known to be on the network, correlation detection engine 910 creates an alert 910a and feeds that alert into policy engine 920. Policy engine 920 evaluates the threat and determines if action is needed based on the policies that are currently in force. Under the current policies, if the policy manager determines that an action is necessary, policy engine 920 generates one or more response policies 920a, which are potential procedures for neutralizing the threat 910a (step 820). Policy engine 920 may generate response policies 920a dynamically by examining network model 950 to determine which procedures would be effective for neutralizing the threat 910a. Policy engine 920 may also be programmed in advance with standard response procedures for responding to various threats that are not as dependent on the current state of the network 960. In certain embodiments, policy engine 920 will generate response policies 920a that range from gross in nature, such as disabling all in-bound and out-bound communications, to more granular in nature, such as shutting down a certain port number in a particular workstation or server, to benign in nature, such as taking little or no action. Policy engine 920 may also generate response policies 920a that approach the problem of neutralizing threat 910a from a number of different angles and using a wide range of different techniques.

Policy engine 920 feeds the set of response policies 920a into a response engine 930 (step 830). Response engine 930 evaluates the effects of implementing response policies 920a by, for example, testing each policy against network model 950 to determine what the likely physical and functional impact 950a of the policy would be if implemented in the actual network 960 (step 840). Response engine 930 may also use a priority table 940 that contains priorities 940a or weighted criteria reflecting priorities of operations, departments, devices, personnel, and/or other aspects of the organization. In some embodiments, after response engine 930 has evaluated the impact 950a of a response policy 920a, response engine 930 determines a score 930a, for example, by comparing a policy's network impact 950a to priorities 940a supplied by priority table 940 (step 850).

For example, as depicted in FIG. 10, priority set 1010 may indicate that the continued and uninterrupted operation of the organization's accounting department may be the most important factor, indicated by a weight of 7.5 out of 10, when considering any potential response to a network attack, whereas the continued operation of the human resources department may be a less important factor, indicated by a weight of 2.3. Policy engine 920 may propose one potential response policy 920a for responding to a network attack that comprises disabling email access for the entire enterprise. Response engine 930 may determine the network impact 950a of the response policy 920a of disabling email access by testing that policy against the network model 950. The network impact 950a may indicate that such a policy would have a significantly negative impact on some departments within the enterprise, such as accounting and human resources, while not effecting other departments as severely. Applying priority set 1010 to the determined network impact 950a of response policy 920a, response engine 930 might assign a low score 930a to response policy 920a due to its negative impact on the accounting department, the continued operation of which is assigned significant weight in priority set 1010.

Alternatively, policy engine 920 may propose a second potential response policy 920a for responding to the network attack that comprises blocking all communications that utilize a particular port number. Response engine 930 may determine the network impact 950*a* of the response policy 920*a* of blocking certain port communications by testing that policy against the network model 950. The network impact 950*a* may indicate that such a policy would have minimally negative impact on the accounting department, a significant impact on the human resources department, and a moderate impact on the out-bound communications of the enterprise. Applying priority set 1010 to the determined network impact 950*a* of response policy 920*a*, response engine 930 might assign a higher score to response policy 920*a* due to its low impact on the strongly weighted accounting department, despite its significant impact on the less strongly weighted human resources department. Thus, using priority set 940*a*, response engine 930 may determine the desirability of certain potential responses to a network attack according to current enterprise priorities by identifying the response having the highest score (step 880) and thereby implement the response that has the least negative aggregate impact on the various priorities within the enterprise (step 890).

Moreover, as depicted in FIG. 10, priority table 1000 may include multiple, alternative priority sets 1010, 1020, and 1030 that may be used to evaluate potential responses depending on factors such as the time of day, the state of current mission operations, or the severity of the attack. For example, in the event that a network attack occurs during non-working hours, response engine 930 may use priority set 1020 instead of priority set 1010. Priority set 1020 may reflect a decreased importance of the continued operations of the accounting department, and may instead reflect an increased importance of the continued operations of the field operations department given that there may be fewer employees working to handle field operations matters manually in the event of an interruption of automated services. Using priority set 1020, response engine 930 may determine that a number of potential response policies 920*a* that may have scored lowly under priority set 1010 during normal business hours now score more highly.

Likewise, there may be times when, due to the pendency of certain mission-critical operations, response engine may use priority set 1030, which significantly prioritizes uninterrupted field operations over all other considerations. In such a situation, response engine 930 may elect to pursue certain remedial courses of conduct, such as disabling entire servers or sub-networks, that drastically impact other operations of the enterprise in order to ensure continued field operations.

Those skilled in the art will appreciate that priority table 1000, as well as priority sets 1010-1030, may be organized or structured in many different ways and may reflect many different types of priorities and associated weights. Moreover, priority table 1000 may include priority sets that, rather than providing static and independent weights for each priority, contain complex and inter-dependent relationships between the different priorities. For example, although out-bound communications may be weighted lower than in-bound communications in priority set 1010, priority set 1010 may also contain algorithms that cause the weight attached to out-bound communication to begin to increase once the negative impact on in-bound communications has reached a certain threshold. Priority table 1000 may additionally provide functionality for dynamically determining or weighing different priorities based on conditions such as the time of day, the state of the network, the nature of the threat, or user input.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. Accordingly, the invention is not limited to the above-described embodiments, but instead is defined by the appended claims in light of their full scope of equivalents.

What is claimed is:

1. A computer system for providing security in a computer network, the system comprising:
   a global sensor device configured to determine potential threats to the computer network by monitoring new domain registrations and identifying one or more suspect domain names, wherein the one or more suspect domain names include one or more domain names that are inconsistent with domain naming practices associated with non-mailcious domain names;
   a global threat manager device configured to determine identification information associated with the potential threats; and
   a local security device configured to detect the existence of the potential threats based on the identification information and to take remedial action in response to the potential threats.

2. The computer system as in claim 1, wherein the local security device is further configured to detect the existence of potential threats by detecting communication between a device within the computer network and a device outside of the computer network, wherein the device outside of the computer network is associated with a suspect domain name.

3. The computer system as in claim 1, wherein the identification information includes an Internet Protocol address associated with one or more of the one or more suspect domain names.

4. The computer system as in claim 3, wherein the local security device is further configured to detect the existence of potential threats by detecting communication between a device within the computer network and a device outside of the computer network, wherein the device outside of the computer network is associated with an Internet Protocol address associated with a suspect domain name.

5. The computer system as in claim 1, wherein the global sensor device is configured to determine potential threats to the computer network by analyzing one or more emails to identify suspect emails.

6. The computer system as in claim 5, wherein the identification information includes a domain associated with one or more suspect emails.

7. The computer system as in claim 6, wherein the local security device is further configured to detect the existence of potential threats by detecting communication between a device within the computer network and a device outside of the computer network, wherein the device outside of the computer network is associated with a domain name associated with one or more suspect emails.

8. The computer system as in claim 5, wherein the identification information includes an Internet Protocol address associated with one or more suspect emails.

9. The computer system as in claim 8, wherein the local security device is further configured to detect the existence of potential threats by detecting communication between a device within the computer network and a device outside of the computer network, wherein the device outside of the computer network is associated with an Internet Protocol address associated with one or more suspect emails.

10. A computer-implemented method of providing security in a computer network, comprising:
    receiving information relating to potential threats to the computer network, wherein the information includes one or more suspect domain names and the one or more suspect domain names include one or more domain names that are inconsistent with domain naming practices associated with non-malicious domain names;

determining identification information associated with the potential threats;

detecting the existence of one or more of the potential threats based on the identification information; and taking remedial action related to the one or more detected potential threats.

11. The method of claim 10, wherein detecting the existence of one or more of the potential threats based on the identification information further comprises:

detecting communication between a device within the computer network and a device outside of the computer network, wherein the device outside of the computer network is associated with a suspect domain name.

12. The method of claim 10, wherein the identification information includes an Internet Protocol address associated with one or more of the one or more suspect domain names.

13. The method of claim 12, wherein detecting the existence of one or more of the potential threats based on the identification information further comprises:

detecting communication between a device within the computer network and a device outside of the computer network, wherein the device outside of the computer network is associated with an Internet Protocol address associated with a suspect domain name.

14. The method of claim 10, wherein the information relating to potential threats includes information associated with one or more suspect emails.

15. The method of claim 14, wherein the identification information includes a domain associated with the one or more suspect emails.

16. The method of claim 15, wherein detecting the existence of one or more of the potential threats based on the identification information further comprises:

detecting communication between a device within the computer network and a device outside of the computer network, wherein the device outside of the computer network is associated with a domain name associated with one or more suspect emails.

17. The method of claim 14, wherein the identification information includes an Internet Protocol address associated with one or more suspect emails.

18. The method of claim 17, wherein detecting the existence of one or more of the potential threats based on the identification information further comprises:

detecting communication between a device within the computer network and a device outside of the computer network, wherein the device outside of the computer network is associated with an Internet Protocol address associated with one or more suspect emails.

19. A computer-implemented method of evaluating the impact of remedial responses to a network attack, comprising:

maintaining a virtual model of the network, wherein the virtual model is periodically updated to reflect the state of the network;

detecting a network attack;

generating a plurality of candidate remedial responses to the network attack;

determining a potential network impact of each candidate remedial response using the virtual model of the network; and outputting information relating to the potential network impact of each candidate remedial response.

20. The method of claim 19, wherein the potential network impact represents what the state of the network would be if the candidate remedial response were implemented.

21. The method of claim 19, further including:

for each candidate remedial response:

determining the impact of the candidate remedial response on one or more priorities based on the potential network impact;

generating an impact score for the candidate remedial response based on the one or more priorities; and outputting the impact score.

22. The method of claim 21, wherein the one or more priorities include at least one of network vulnerabilities, traffic type, protocols, links and nodes, and mission priorities.

23. The method of claim 21, further including:

implementing the candidate remedial response corresponding to the impact score representing the least negative impact on the one or more priorities.

24. The method of claim 21, wherein two or more priorities have differing weights reflecting differing degrees of importance.

25. The method of claim 24, further including:

modifying the weight associated with one or more priorities.

26. A computer system for evaluating the impact of remedial responses to a network attack, comprising:

one or more devices configured to:

maintain a virtual model of the network and to periodically update the virtual model to reflect the state of the network;

detect a network attack;

generate a plurality of candidate remedial responses to the network attack;

determine a potential network impact of each candidate remedial response using the virtual model of the network; and output information relating to the potential network impact of each candidate remedial response.

27. The computer system of claim 26, wherein the potential network impact represents what the state of the network would be if the candidate remedial response were implemented.

28. The computer system of claim 26, wherein the one or more devices are further configured to:

determine the impact of each candidate remedial response on one or more priorities based on the potential network impact;

generate an impact score for each candidate remedial response based on the one or more priorities; and output the impact score for each candidate remedial response.

29. The computer system of claim 28, wherein the one or more priorities include at least one of network vulnerabilities, traffic type, protocols, links and nodes, and mission priorities.

30. The computer system of claim 28, wherein the one or more devices are further configured to:

implement the candidate remedial response corresponding to the impact score representing the least negative impact on the one or more priorities.

31. The computer system of claim 28, wherein two or more priorities have differing weights reflecting differing degrees of importance.

32. The computer system of claim 31, wherein the one or more devices are further configured to:

modify the weight associated with one or more priorities.

33. A computer system for providing security in a computer network, the system comprising:

a global sensor device configured to determine potential threats to the computer network by monitoring new domain registrations and identifying one or more suspect domain names, wherein the one or more suspect domain names include one or more domain names that are inconsistent with domain naming practices associated with non-malicious domain names;

a global threat manager device configured to determine identification information associated with the potential threats;

a network model device configured to maintain a virtual model of the network and to periodically update the virtual model to reflect the state of the network; and a local security device configured to:
  detect the existence of a potential threat based on the identification information;
  generate a plurality of candidate remedial responses to the network attack;
  determine a potential network impact of each candidate remedial response using the virtual model of the network; and
  output information relating to the potential network impact of each candidate remedial response.

\* \* \* \* \*

UNITED STATES PATENT AND TRADEMARK OFFICE
CERTIFICATE OF CORRECTION

PATENT NO. : 8,407,791 B2
APPLICATION NO. : 12/813961
DATED : March 26, 2013
INVENTOR(S) : Edouard Granstedt et al.

Page 1 of 1

It is certified that error appears in the above-identified patent and that said Letters Patent is hereby corrected as shown below:

Title page, item (73) "Assignee: Qinetiq North America, Inc." should read --Assignee: QinetiQ North America, Inc.--.

Signed and Sealed this
First Day of October, 2013

Teresa Stanek Rea
*Deputy Director of the United States Patent and Trademark Office*